United States Patent [19]

Gigola

[11] Patent Number: 5,601,485
[45] Date of Patent: Feb. 11, 1997

[54] BLACKOUT PANELS

[76] Inventor: Antonio Gigola, Via IV° Novembre, 3, 25046 Cazzago San Martino (Brescia), Italy

[21] Appl. No.: 537,998

[22] Filed: Oct. 2, 1995

[30] Foreign Application Priority Data

Oct. 5, 1994 [IT] Italy .................... BS94A0116

[51] Int. Cl.⁶ .......................................... F24F 7/00
[52] U.S. Cl. ........................................ 454/277; 454/905
[58] Field of Search ..................... 454/208, 224, 454/276, 277, 279, 281, 282, 367, 905

[56] References Cited

U.S. PATENT DOCUMENTS 3,285,156  11/1966  Bohanon ..................... 454/905 X
3,628,442  12/1971  Nijhuis ....................... 454/905 X
5,133,692  7/1992   Koop .......................... 454/905 X
5,238,451  8/1993   Wulf et al. ................. 454/905 X

*Primary Examiner*—Harold Joyce
*Attorney, Agent, or Firm*—Shlesinger Fitzsimmons Shlesinger

[57] ABSTRACT

A light eliminator or blackout panel for use with air circulating fans and the like includes a series of plates each having a plurality of spaced fins protruding from one face thereof to form a plurality of channels opposite ends of which face the lateral side edges of the associated plate. The plates are mounted in spaced, confronting relation with each other to form a blackout panel in which the open sides of the channels of one plate are closed by the next adjacent plate in the series.

18 Claims, 3 Drawing Sheets

Fig. 1
Fig. 2
Fig. 3
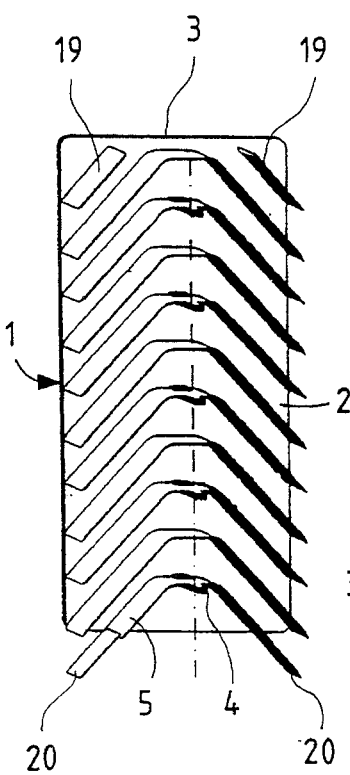
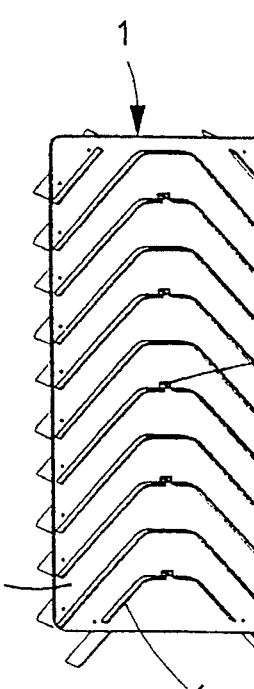
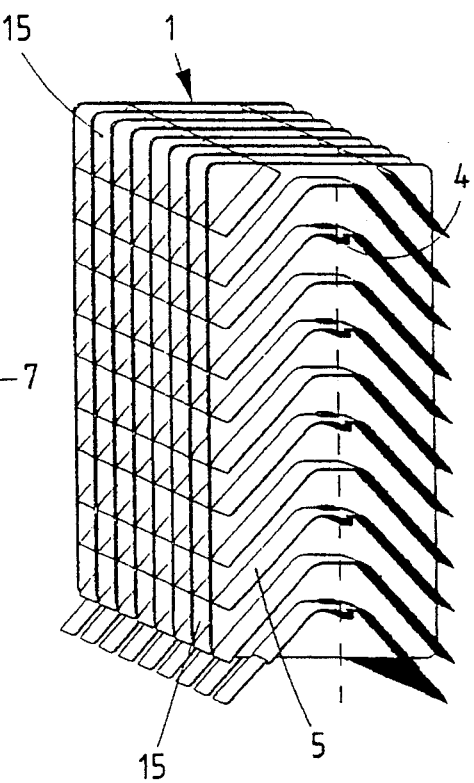
Fig. 6
Fig. 7
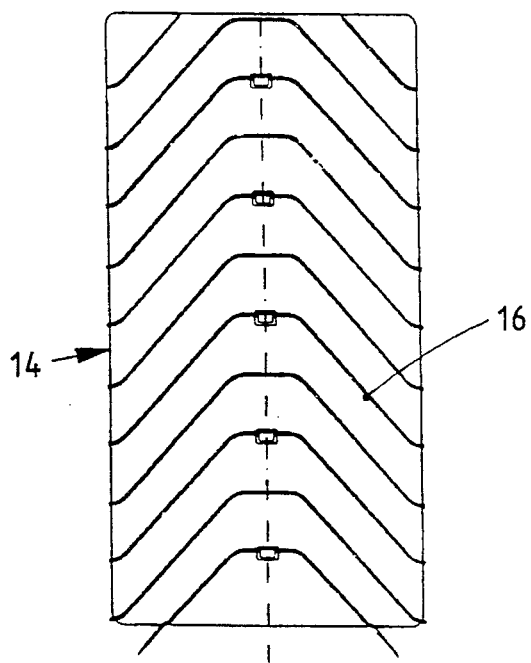
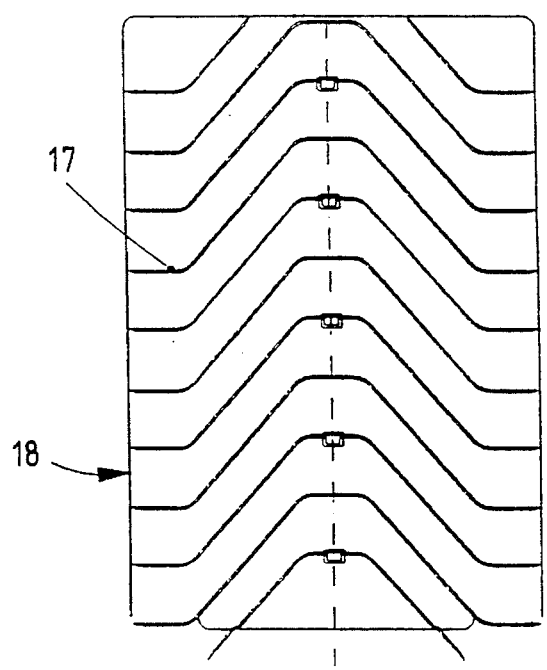

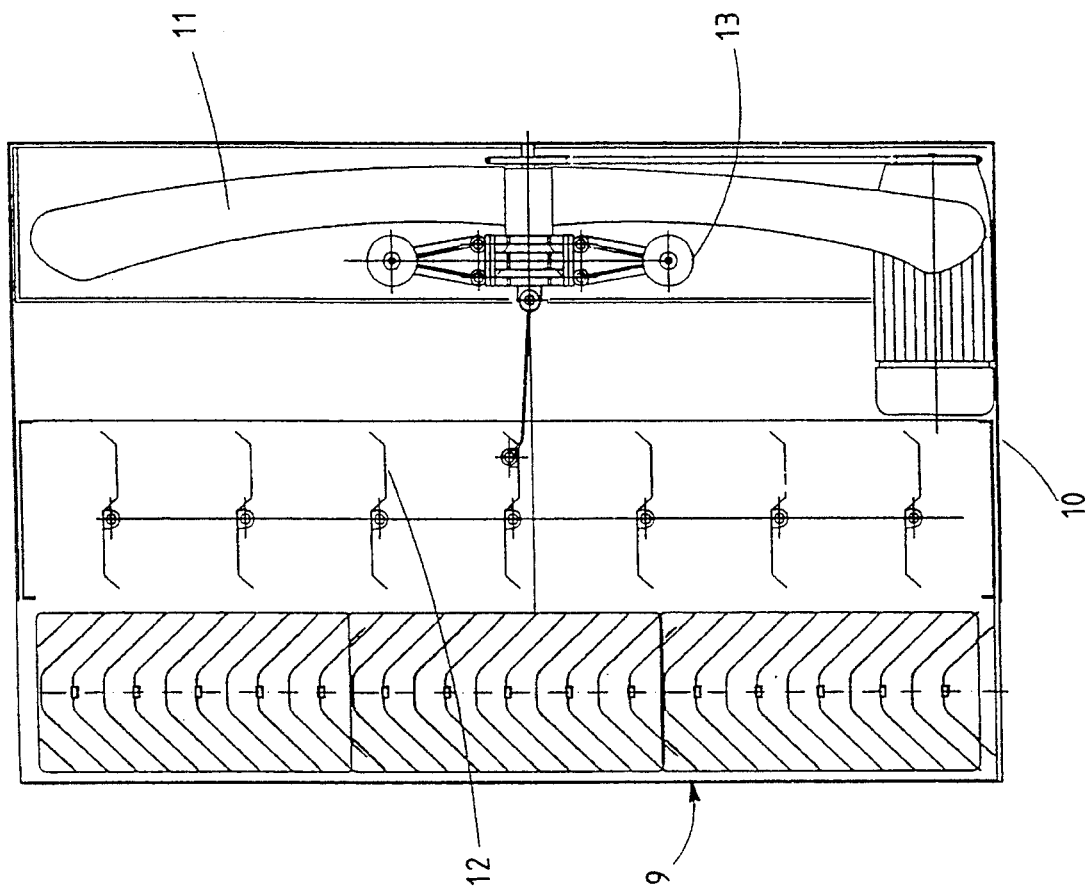
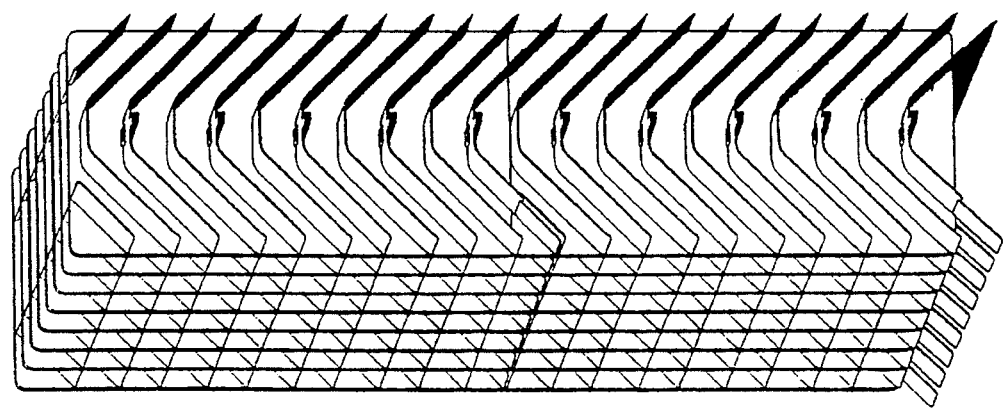

BLACKOUT PANELS

BACKGROUND OF THE INVENTION

This invention refers to sectional elements arranged to form blackout panels or walls with passage of air, and panels or walls obtained with such elements.

Blackout panels or walls with passage of air are usually used to screen apertures for the circulation of air, forced or otherwise, between the outside and closed environments, whenever it is required to prevent light from entering through the aeration apertures.

For example, a typical use is in animal breeding farms where it is necessary to ensure an efficient exchange of air between the areas containing the animals and the outside, while it is not always desirable for the outside light to penetrate into the premises and disturb, for example, the artificial sleep-wake cycles.

In the known technique there are known screening barriers formed by panels or walls traversed by more or less sinuous passages. The air can thus pass through the wall, by means of the passages therein, while the light is screened by means of the curvature of each passage. The barriers of known technique are usually made in the form of a plurality of modular blocks disposed side by side, each block comprising a bidimensional matrix of rows and columns for the passage of air.

A modular type structure of this kind however has a number of drawbacks, such as, for example, a relatively high cost due to the relatively complicated production of each module. Moreover, the relatively extensive width of each modules makes it impossible to easily obtain panels of variable sizes with a small pitch. The modular structures of known technique also suffer from problems in the areas of conjunction between adjacent modules and generally require complex operations consisting of sealing and/or adding side supporting walls interposed between adjacent modules to prevent the passage of light in said areas of conjunction. This also results in a high cost of installation.

A further problem consists in the difficulty of gaining access to the inside of each passage which extends between the opposing faces of the module. In the event of partial or total obstruction of one of the passages due to the entry of foreign matter, dirt or dust conveyed by the flow of air, cleaning the passages of the modules is a long and tedious operation and, very often the only solution is to replace the entire module. In any case, maintenance is slow and costly.

The general scope of this invention is to obviate the aforementioned problems by providing elements and panels with an innovative modular structure which is easy to produce, assemble and maintain, and with excellent light barrier and air passage characteristics.

SUMMARY OF THE INVENTION

This scope is achieved, according to the invention, by providing a modular element for the composition of blackout panels with airflow passage, comprising: a substantially flat plate; first fins protruding by one free edge from at least one face of the plate to define open channels between them and with opposing ends facing onto opposing lateral edges of the plate; connecting means designed to permit the assembly of the element with other elements to form a blackout panel having on opposing faces the extreme opposites of the channels and the plates of the elements disposed crosswise to its extension.

This scope is further achieved, according to the invention, by providing a panel comprising a plurality of said elements disposed side by side in a row so that the plates are parallel to one another, each plate closing the channels of an adjacent element to create ducts with ends opening out on opposing faces of the panel to allow the passage of air between said opposing faces of the panel.

BRIEF DESCRIPTION OF THE DRAWINGS

The innovative principles of this invention and its advantages with respect to the known technique will be more clearly evident from the following description of possible exemplificative embodiments applying such principles, with reference to the accompanying drawings, in which:

FIG. 1 shows a perspective view of a first modular element viewed from its side face;

FIG. 2 shows a view similar to FIG. 1, but viewed from the other face of the element;

FIG. 3 shows a perspective view of a portion of the structure of a screen obtained by composing several modular elements disposed side by side;

FIG. 4 shows a perspective view of a portion of the structure of a screen extended vertically by superimposing several modular elements;

FIG. 5 shows a schematic side view of a screen according to the invention applied to a known forced air circulation system;

FIG. 6 shows a side view of a first embodiment of the element of FIG. 1;

FIG. 7 shows a side view of a second embodiment of the element of FIG. 1;

DETAILED DESCRIPTION OF THE INVENTION

Figure 8:
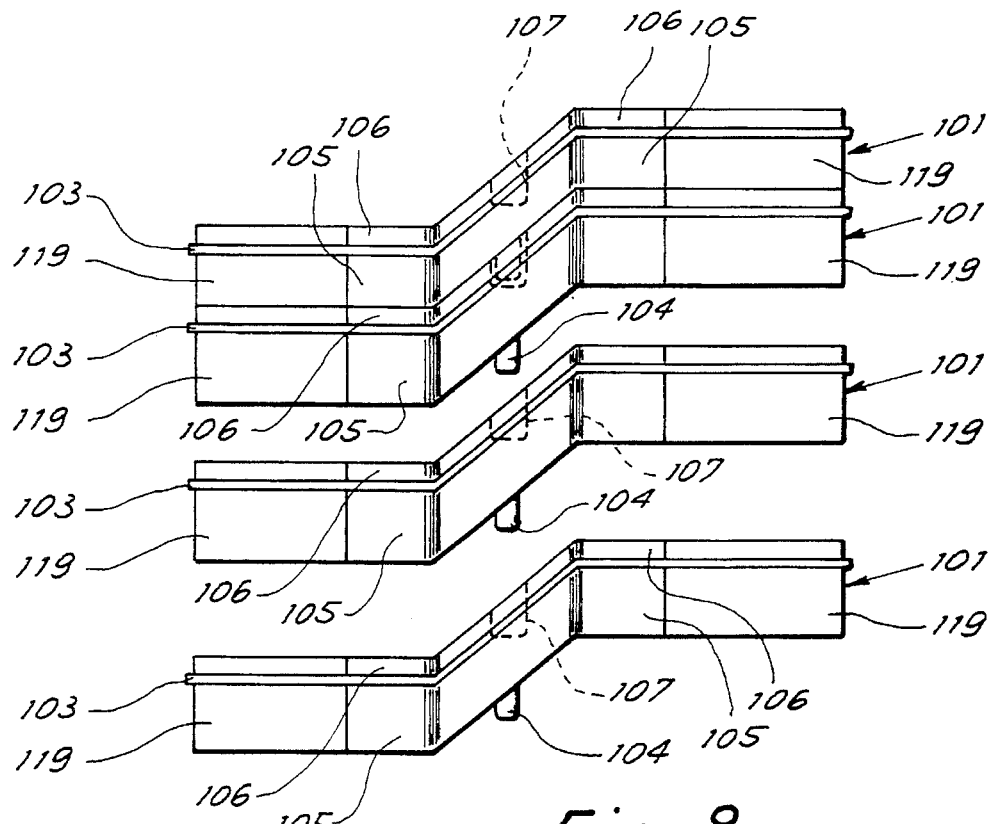
FIG. 8 shows a partially exploded top plan scrap view of a further embodiment of the element of FIG. 1.

With reference to the figures, FIG. 1 shows a single-walled modular element, generically indicated by reference 1, made according to the invention and advantageously moulded in one piece from plastic material. The element 1 comprises a rectangular-shaped and substantially flat wall element or plate 3, from one face of which protrudes a plurality of fins 5, disposed parallel to one another to define open channels 2 between one another.

The fins are shaped to extend between opposing side edges of the plate 3 with generally upturned V pattern, at least on one portion, so that the aperture formed at one end of each channel 2 on one edge of the plate is not directly in view when observed from the other aperture formed by the opposite end of the channel which faces onto the opposing edge of the plate. In other words, inside each channel there are no straight-line sections between the ends of the channel.

Advantageously, for reasons that will be explained further on, disposed above each slanted portion of the uppermost fin 5, which is closest to the edge of the upper end of plate 3, is an additional slanted fin 19, shaped so as to be parallel to the underlying slanted portion of the uppermost fin 5.

Moreover, the fin 5 closest to the lower end edge of the plate 3 has ends or end portions 20 which extend, slightly offset compared to the surface of adjacent portions of the fin, beyond the lower edge of the plate 3.

Advantageously, as can be seen in FIG. 2, the element 1 can have seats on the face opposite that of the fins 5 to receive the edges of the fins 5 of another element, as will be clear further on. The seats can be achieved by means of additional fins 6. The fins 6 can be made as simple low-projecting ribs (for example, equivalent to one-tenth of the projection of the fins 5, as can be easily seen in the drawings).

The fins 6 have substantially the same pattern and the same pitch as the corresponding fins 5 on the other side of the plate, but are vertically offset slightly with respect to the fins 5 by a degree substantially equivalent to the thickness of the edge of the fins 5.

FIG. 3 shows a structure of a blackout panel composed of a plurality of elements 1 assembled together with walls 3 parallel to one another. As can be seen in this figure, the plates 3 of each element laterally close the channels 2 of the adjacent element, so as to form passages or ducts 15 which open on the opposite faces of the structure. The fins 6 one element help to complete the connection by supporting the edges of the fins 5 and wall 3 of the adjacent element 1. Moreover, each fin or rib 6 of one element forms a lateral support for the edge of the corresponding fin 5 of the other adjacent element 1.

FIG. 4 shows the superposition of several structures or blocks similar to those of FIG. 3. As can be clearly seen, the protrusions or end portions 20 of the lowermost fins 5 of the upper structure or block rest on and couple with the fins 19 of the lower structure or block, so as to provide a function of alignment between the structures, as well as the substantial continuity of the channel 15. Elements 1 can therefore be placed side by side and on top of one another as shown in FIGS. 3 and 4 to form a composite screening panel or structure of the required dimensions.

FIG. 5 shows a cross-sectional side view of part of a forced ventilation system, the remainder of which is of known technique, using a similar composite structure, indicated by reference 9. The system comprises a box-shaped structure 10 to be fitted in an aperture in a wall of the environment to be ventilated. A fan 11 agitates the air to introduce or extract it from the environment through the ducts 15 in the blackout structure. The system can also comprise a known automatic device 13 for opening the dampers 12 upon operation of the fan.

Returning to FIGS. 1 and 2, assembly of the elements 1 with one another can be advantageously achieved by means of pressure couplings, for example to enable the elements 1 to be rapidly assembled without glue and/or tools and rapidly disassembled whenever necessary. For this purpose, each element 1 can comprise complementary couplings on opposing sides. For example, the side of plate 3 with the fins 5 can be provided with projecting pins or plugs 4 and the side with the fins 6 can be provided with complementary slots or holes 7, the plugs 4 of one element 1 being designed to fit into the slots 7 of an adjacent element 1.

It has been found advantageous to provide slots and plugs in correspondence with the centre line of the length of the fins, on every alternate fin.

The elements can in this way be assembled and disassembled manually, without the need for tools, while forming an extremely sturdy and rigid structure. The individual elements, even though very simple in structure, can be made, thanks to their shape, with a relatively high degree of rigidity so as to enable them to be easily handled and easily assembled into the structure.

At this point it will be clear that the intended scopes have been achieved by providing modular elements that are easily produced, assembled and, in the event of removable assembly between single-walled elements 1, rapidly disassembled, for example to gain access to the individual passages 15 and clean them easily and thoroughly. The blackout panel obtained according to the invention, despite its structural simplicity, ensures an optimal passage of air between the two sides, without allowing light to pass through.

To ensure that there are no reflections along the ducts 15, the elements 1 can be made with opaque surfaces, advantageously black. For example, the surfaces can be made slightly rough and deprived of their shine by sandblasting or other particular known procedures for producing the moulds with which the elements are manufactured.

The foregoing description of an embodiment applying the innovative principles of this invention is obviously given by way of example in order to illustrate such innovative principles and should not therefore be understood as a limitation to the sphere of the invention claimed herein. For example, the exact conformation of the air passage channels can vary according to particular requirements, both in order to obtain free passage of the air without excessive loss of speed also in particular cases, and in order to impart a desired direction to the outgoing flow of air from the blackout structure. For example, FIGS. 6 and 7 show possible variations of the embodiment of the single-walled element, indicated by reference 14 and 18, respectively. In said variations 14, 18, which for the remainder are substantially similar to the element 1 described above, the ends (16, 17 respectively) of the fins are shaped to form inlets and outlets of the ducts which impart a desired inclination to the flow of air. For example, shaped elements as in FIG. 7 direct the flow in a direction substantially perpendicular to the blackout panel.

The connecting means between the elements can also differ from the ones shown. For example, whenever it is not required for an assembly, even partial, to be disassemblable the connecting means can be made from surfaces of the elements suitable for reciprocal glueing or welding of the elements. These surfaces can also be the simple free edges of the fins and the face of the wall they rest upon when two elements are brought together. The elements of a similar shape can also be integrated or intercalated with elements of a different shape.

FIG. 8 shows a further embodiment. Parts similar to those of FIG. 1 are indicated by the same numbers increased by 100.

Consequently, there is a plurality of elements 101 which can be coupled together as shown in FIG. 1, by means of fingers 104 which fit into seats 107. The element 101 comprises a rectangular shaped wall element or plate 103, from one face of which protrudes a plurality of fins 105, parallel with one another to form channels between them. The opposite face of the wall 103 is provided with seats 106 to receive the edge of the respective fins 105. The fins are generically V shaped as shown for the fins of FIG. 1.

Unlike the embodiment of FIG. 1, the wall 103 has a curved shape between the opposing side edges of the plate between which the channels formed between the fins 119 extend.

For example, as shown in FIG. 8, the curved shape can comprise two opposing curves so as to form an S shape. The portions of the plate closest to the side edges can be parallel to each other to define aligned portions of channel.

Figure 9:
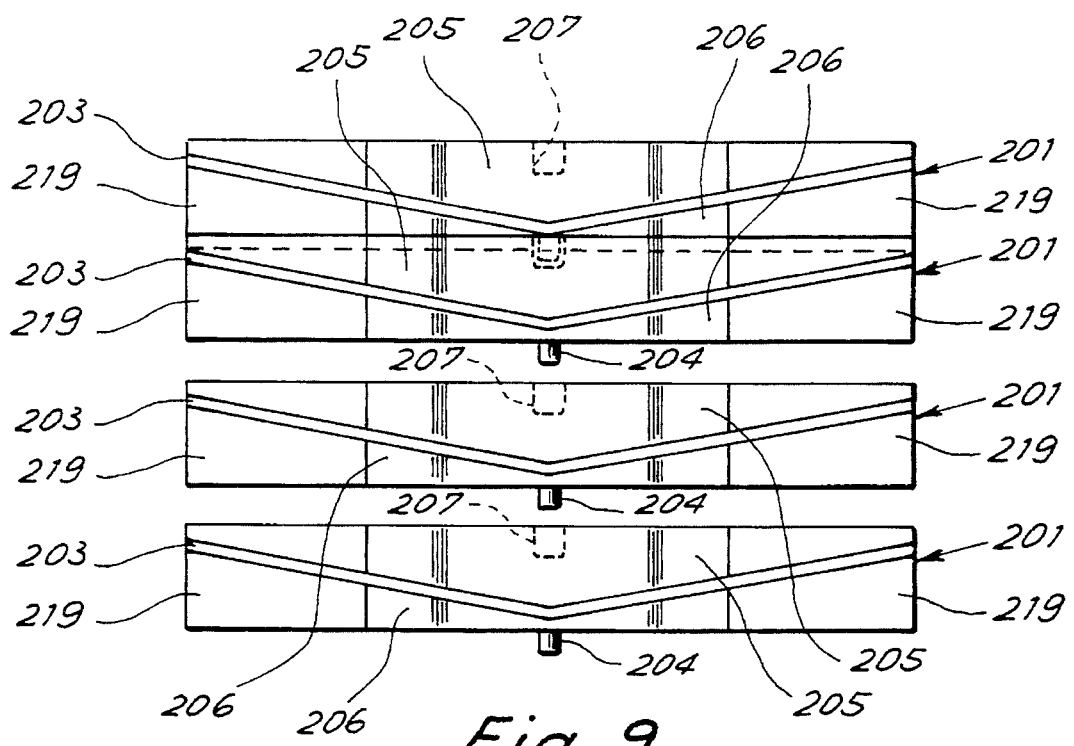
FIG. 9 shows a partially exploded top plan scrap view of a further embodiment of the element of FIG. 1.

FIG. 9 shown an embodiment with a curved plate, in which the plate is bent into a V.

Parts similar to those of FIG. 1 are indicated with the same numbers increased by 200. Consequently, there is a plurality of elements 201 which can be coupled together, as shown in FIG. 1, by means of fingers 204 which fit into seats 207. The element 201 comprises a rectangular shaped wall element or plate 203, from one face of which protrudes a plurality of fins 205, parallel with one another and generically V shaped to form channels between them, in a similar way to the fins of FIG. 1. The opposite face of the wall 203 is provided with seats 206 to receive the edge of the respective fins 205. The seats are substantially formed by the edge of ribs 206 which extend from the wall 203 to form fins 206 with edges substantially complementary to the edge of the fins 205 to form substantial extensions of the fins 205 when two elements 201 are coupled together.

With curved shaped plates, as shown for example in FIGS. 8 and 9, an even greater light shield is obtained, since the passages between the two faces of the panel are curved not only in a vertical direction but also in a horizontal direction.

What is claimed is:

1. A modular element for producing blackout panels with airflow passages, comprising; a plate; a first plurality of spaced fins protruding from at least one face of the plate to define therebetween channels having open sides between the outer edges of said fins, and with opposing ends of said channels facing onto opposing lateral side edges of the plate; connecting means designed to permit the assembly of a series of the plates in spaced, confronting relation with each other to form a blackout panel having said one face of each plate in said series confronting upon and having said open sides of the channels thereon closed by the opposite side of the next adjacent plate in said series.

2. An element as claimed in claim 1, characterized by the fact that the fins of each plate extend between said opposing edges of the plate in a curved pattern so that on the inside of each channel there are no straight-line sections between the opposite ends of the channel itself.

3. An element as claimed in claim 2, characterized by the fact that the curved pattern is substantially V-shaped.

4. An element as claimed in claim 1, characterized by the fact that disposed on the opposite face of the plate are seats shaped to house the outer edges of the first fins of an adjacent plate of a blackout panel.

5. An element as claimed in claim 4, characterized by the fact that the seats are obtained by means of ribs protruding from said opposite face of the plate with a pattern and pitch substantially identical to those of the first fins, but offset with respect to the outer edges of the first fins by at least the thickness of said edges to constitute a support for the outer edges of the first fins of an adjacent plate in the blackout panel.

6. An element as claimed in claim 1, characterized by the fact that the connecting means comprise pressure coupling means.

7. An element as claimed in claim 6, characterized by the fact that the coupling means comprise at least one plug protruding in a perpendicular direction from one of two opposite surfaces of the plate and at least one complementary seat disposed on the other of said two opposite surfaces of the plate.

8. An element as claimed in claim 7, characterized by the fact that the plug is disposed on the edge of one fin, in a position substantially central to its length between opposing edges of the plate.

9. An element as claimed in claim 1, characterized by the fact that the plate is rectangular in shape with a first end edge thereof extending between said side edges of the plate, and the fin closest to said end edge having opposite end portions thereof adjacent to the side edges of the plate extending beyond the first end edge of the plate.

10. An element as claimed in claim 9, characterized by the fact that the plate has additional fins disposed close to a second end edge opposite said first end edge, the additional fins being designed to constitute a support for said end portions of another plate when said other plate is supported on the first-named plate.

11. An element as claimed in claim 1, characterized by the fact that the plate has a curved pattern between said opposing side edges.

12. An element as claimed in claim 11, characterized by the fact that the curved pattern of the plate comprises at least two curves in opposite directions.

13. An element as claimed in claim 12, characterized by the fact that areas of the plate close to the two opposing side edges thereof are parallel with one another.

14. An element as claimed in claim 11, characterized by the fact that the plate has a generically V-shaped curve.

15. An element as claimed in claim 14, characterized by the fact that the opposite face of the plate is provided with seats shaped to receive the outer edges of the first fins of an adjacent plate of a blackout panel, the seats being formed by the ends of a second plurality of fins protruding from said opposite face of the plate to form an extension of the fins of said adjacent plate.

16. A blackout panel with airflow passages therethrough, comprising a plurality of plates made according to claim 1, said plates being disposed side by side in a row so as to have the plates parallel with one another, each plate constituting a closure for the open sides of the channels of an adjacent plate so as to form ducts with ends open on opposite faces of the panel thereby to allow the passage of air between said opposite faces of the panel.

17. A panel as claimed in claim 16, comprising a plurality of superimposed rows of said plates with respective plates of one row thereof disposed in coplanar relation with registering plates of and adjacent row, and with the side edges of the plates aligned from one row to another.

18. A panel as claimed in claim 16 or 17, characterized by the fact that all the plates of said plurality thereof are identical to one another.

\* \* \* \* \*